US006857351B2

(12) United States Patent
Cutter et al.

(10) Patent No.: US 6,857,351 B2
(45) Date of Patent: Feb. 22, 2005

(54) PORTABLE COMBUSTIBLE FUEL AUTOMATIC DRIP COFFEE MAKER

(76) Inventors: Geoffrey D. Cutter, P.O. Box 3, Dalton, MA (US) 01227; Robert J. Zsofka, P.O. Box 3, Dalton, MA (US) 01227

( * ) Notice: Subject to any disclaimer, the term of this patent is extended or adjusted under 35 U.S.C. 154(b) by 46 days.

(21) Appl. No.: 10/635,022

(22) Filed: Aug. 6, 2003

(65) Prior Publication Data

US 2004/0025702 A1 Feb. 12, 2004

Related U.S. Application Data

(60) Provisional application No. 60/402,066, filed on Aug. 9, 2002.

(51) Int. Cl.[7] .................................................. A47J 31/00
(52) U.S. Cl. .............................. 99/279; 99/284; 99/288; 99/305; 99/307
(58) Field of Search .......................... 99/279, 284, 288, 99/290, 300, 304, 305, 306, 307; 426/433, 435

(56) References Cited

U.S. PATENT DOCUMENTS

| 61,454 | A | | 1/1867 | Plumb |
|---|---|---|---|---|
| 368,340 | A | | 8/1887 | Kaplan |
| 1,041,822 | A | | 10/1912 | De Lima |
| 1,852,356 | A | * | 4/1932 | Mercier ........................ 99/307 |
| 3,133,536 | A | | 5/1964 | Knapp |
| 3,978,844 | A | | 9/1976 | Wilkens |
| 4,354,427 | A | | 10/1982 | Filipowicz et al. |
| 4,757,754 | A | | 7/1988 | Welker |
| 5,123,335 | A | | 6/1992 | Aselu |
| 5,195,422 | A | * | 3/1993 | Newnan ....................... 99/283 |
| 5,233,914 | A | | 8/1993 | English |
| 5,274,736 | A | | 12/1993 | Rohr, Jr. |
| 5,690,094 | A | | 11/1997 | Sheinfeld et al. |
| 5,778,765 | A | * | 7/1998 | Klawuhn et al. ............. 99/290 |
| 5,943,945 | A | | 8/1999 | Ishihara |
| 6,123,010 | A | | 9/2000 | Blackstone |
| 6,257,227 | B1 | | 7/2001 | Harbin |
| 6,298,770 | B1 | | 10/2001 | Blankenship et al. |

FOREIGN PATENT DOCUMENTS

| DE | 3517071 | * 11/1986 | .................. 99/288 |
|---|---|---|---|

* cited by examiner

Primary Examiner—Reginald L. Alexander
(74) Attorney, Agent, or Firm—Richard C. Litman

(57) ABSTRACT

Portable combustible fuel automatic drip coffee making apparatuses use combustible fuels such as propane, butane, white gasoline, and kerosene to heat water which can be alternatively used to make drip coffee, or for other requirements calling for heated water, depending on the selected position of a switching valve. The portability of these devices is self contained and hand transportable. The inventive units are designed to be user maintained with easily cleanable or replaceable parts, as well as designed for manufacturing. These units are configured based on the specific fuel being used, and some units are designed to be able to use a variety of fuels in the same unit.

18 Claims, 7 Drawing Sheets

PORTABLE COMBUSTIBLE FUEL AUTOMATIC DRIP COFFEE MAKER

CROSS-REFERENCE TO RELATED APPLICATION

This application is based on a provisional application Ser. No. 60/402,066 filed on Aug. 9, 2002.

BACKGROUND OF THE INVENTION

1. Field of the Invention

The present invention relates to a method for brewing coffee, and in particular, a method for brewing coffee by an automatic drip method, fully portable, and utilizing common combustible fuels in container form as the power source.

2. Description of the Related Art

Modern automatic drip coffee makers are well known, but all depend on external sources, which severely limits their portability. An exception is the battery powered variety, but these are so slow in operation as to be almost unacceptable in the marketplace. Furthermore, of all the truly portable coffee makers available, all are either coffee presses or percolators; none are of the automatic drip variety. As personal tastes for properly brewed coffee expand and refine, obviously the preferred brewing method is automatic drip, where the full flavor is extracted from the coffee bean without exposing the grounds to excessive temperatures, which would impair the true flavor of the coffee.

Accordingly, it is desirable to provide a truly portable automatic drip coffee maker, not reliant on external power sources, and operating within normal, expected preparation times. The present invention answers this need. It uses commonly available combustible fuels, uses the automatic drip method to make coffee (as does a home appliance type coffee maker), and is self-contained, hand-transportable, and not reliant on external power sources.

Portable coffee makers usable in remote locations, such as at camping sites, in recreational vehicles, or on boats are well known. Combustible fuels such as propane, butane, and mixtures as well as liquid fuels such as white gasoline and kerosene, are commonly available through retail outlets, and are used in portable stoves and other devices, such as sold by The Coleman Company.

However, there is a need for a fully portable, automatic drip coffee maker which does not require an electric power source. This invention fulfills this purpose, using one of the commonly available fuel sources, and further provides not only drip coffee, but hot water as well.

Moreover, the inventive coffee maker is designed and constructed to fulfill a further need to permit the easy and convenient removal and replacement of a water heating coil that can typically become fouled and clogged after prolonged use.

U.S. Pat. No. 61,454, issued to Plumb on Jan. 22, 1867, describes a portable oil-burning lamp stove useable for making coffee or water.

U.S. Pat. No. 368,340, issued to Kaplan on Aug. 16, 1887, describes a cooking stove using gas heat or an oil burner to heat water for making tea, coffee and hot water.

U.S. Pat. No. 1,041,822, issued to De Lima on Oct. 22, 1912, describes a portable coffee maker using an alcohol lamp for heating.

U.S. Pat. No. 3,133,536, issued to Knapp on May 19, 1964, describes a propane-heated lantern stove usable for making coffee.

U.S. Pat. No. 3,978,844, issued to Wilkens on Sep. 7, 1976, describes a portable propane heated cooking vessel.

U.S. Pat. No. 4,354,427, issued to Filipowicz et al. on Oct. 19, 1982, describes a coffee or tea-making apparatus using electrical heaters.

U.S. Pat. No. 4,757,754, issued to Welker on Jul. 19, 1988, describes a gas-heated coffee maker, but is not a portable device.

U.S. Pat. No. 5,123,335, issued to Aselu on Jun. 23, 1992, U.S. Pat. No. 5,233,914, issued to English on Aug. 10, 1993, and U.S. Pat. No. 5,274,736, issued to Rohr, Jr. on Dec. 28, 1993, describe coffee makers that are portable using a vehicle cigarette lighter to operate electrical heater elements.

U.S. Pat. No. 5,690,094, issued to Sheinfeld et al. on Nov. 25, 1997, describes a portable combustible gas-heated kettle.

U.S. Pat. No. 5,943,945, issued to Ishihara on Aug. 31, 1999, describes an electrically heated coffee maker.

U.S. Pat. No. 6,123,010, issued to Blackstone on Sep. 26, 2000, teaches a portable electrically heated coffee maker.

U.S. Pat. No. 6,257,227, issued to Harbin on Jul. 10, 2001, describes a coffee maker that uses heat provided by a barbeque grill.

U.S. Pat. No. 6,298,770, issued to Blankenship et al. on Oct. 9, 2001, describes a coffee maker using an elongated valve that is used to switch the water flow between a re-circulation setting, in which the water re-circulates through the heater and the reservoir, and a drip coffee setting, in which the water passes through the coffee grounds into the carafe.

None of the above devices teaches a completely portable, automatic drip coffee maker using combustible fuels.

None of the above inventions and patents, taken either singularly or in combination, is seen to describe the instant invention as claimed. Thus, a portable combustible gas fueled automatic drip coffee maker solving the aforementioned problems is desired.

SUMMARY OF THE INVENTION

The portable combustible fuel automatic drip coffee maker has two separate fluid streams, i.e., a combustible liquid fuel stream and a water stream. The fuel stream begins at a contained fuel supply, such as a refillable reservoir or replaceable container of either propane, butane, regular grade gasoline, white gasoline, kerosene, diesel fuel, naphtha, or even peanut oil, and ends as depleted combustion gases leaving a burner. The water stream includes two pathways: (1) a re-circulating pathway between a water reservoir and a water heater coil, and (2) a one-way drip coffee pathway from the hot water heater coil through a basket and filter containing coffee grounds into a carafe. The water heater coil is positioned directly above the burner in order that the heat from the combustion of the fuel is transferred to the water in the coil.

Accordingly, it is a principal object of the invention to provide a portable automatic drip coffee maker device that uses combustible fuel and additionally provides hot water.

It is another object of the invention to provide a portable automatic drip coffee maker device that uses a water heater coil easily removable and replaceable when fouled.

It is a further object of the invention to provide a portable automatic drip coffee maker device in which the water heater coil and burner are attached together as an assembly using a unique 3-arm support brace for strength and sturdiness.

It is yet a further object of the invention to provide a method of installing the burner and heater assembly into the housing using a unique clip structure.

It is still another object of the invention to provide liquid fuel sources contained in either refillable reservoirs or replaceable cylinders of either propane, butane, regular grade gasoline, white gasoline, kerosene, diesel fuel, naphtha or peanut oil.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
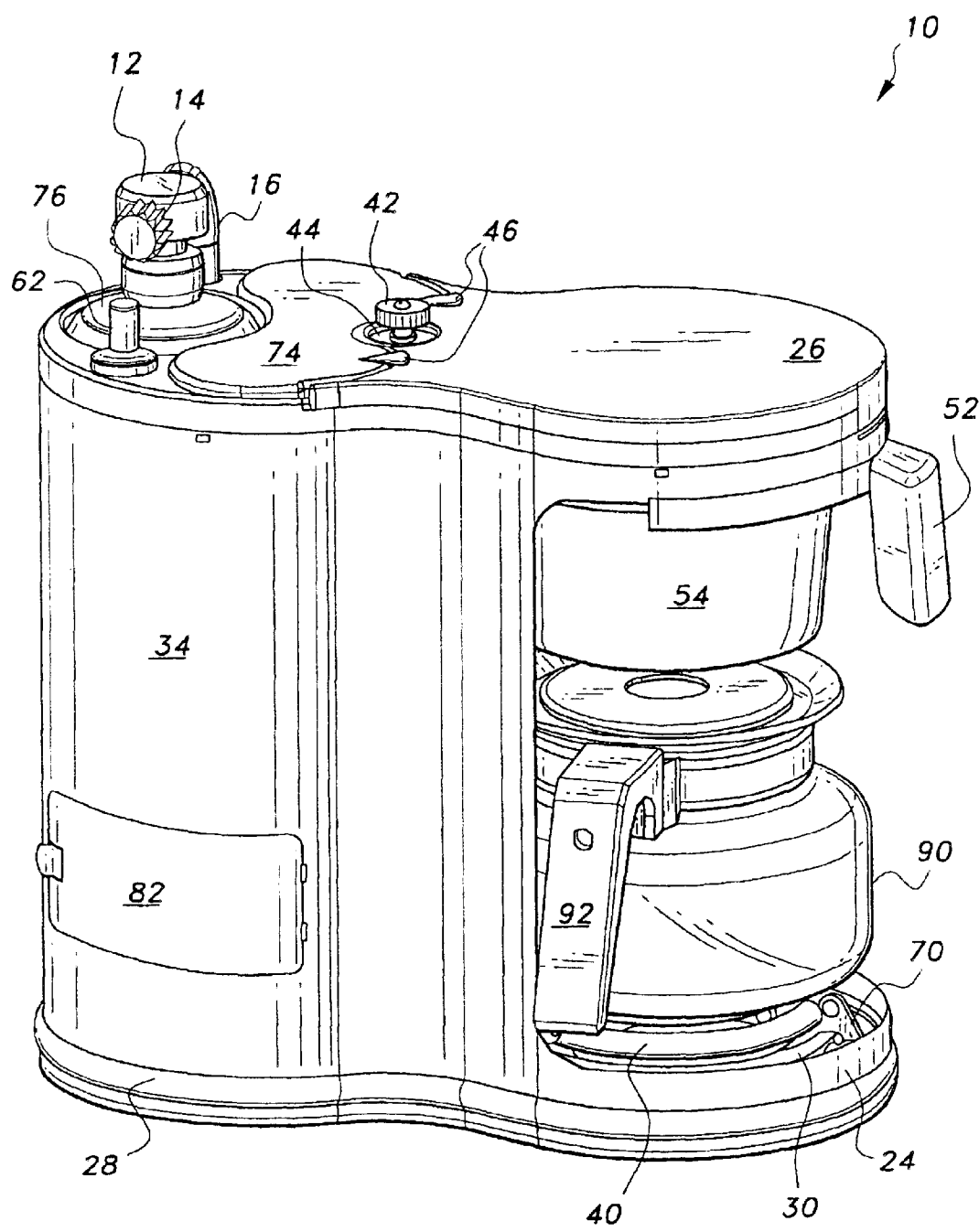
FIG. 1 is an environmental, perspective left side view of a portable combustible gas fueled automatic drip coffee maker according to the present invention.
Figure 2:
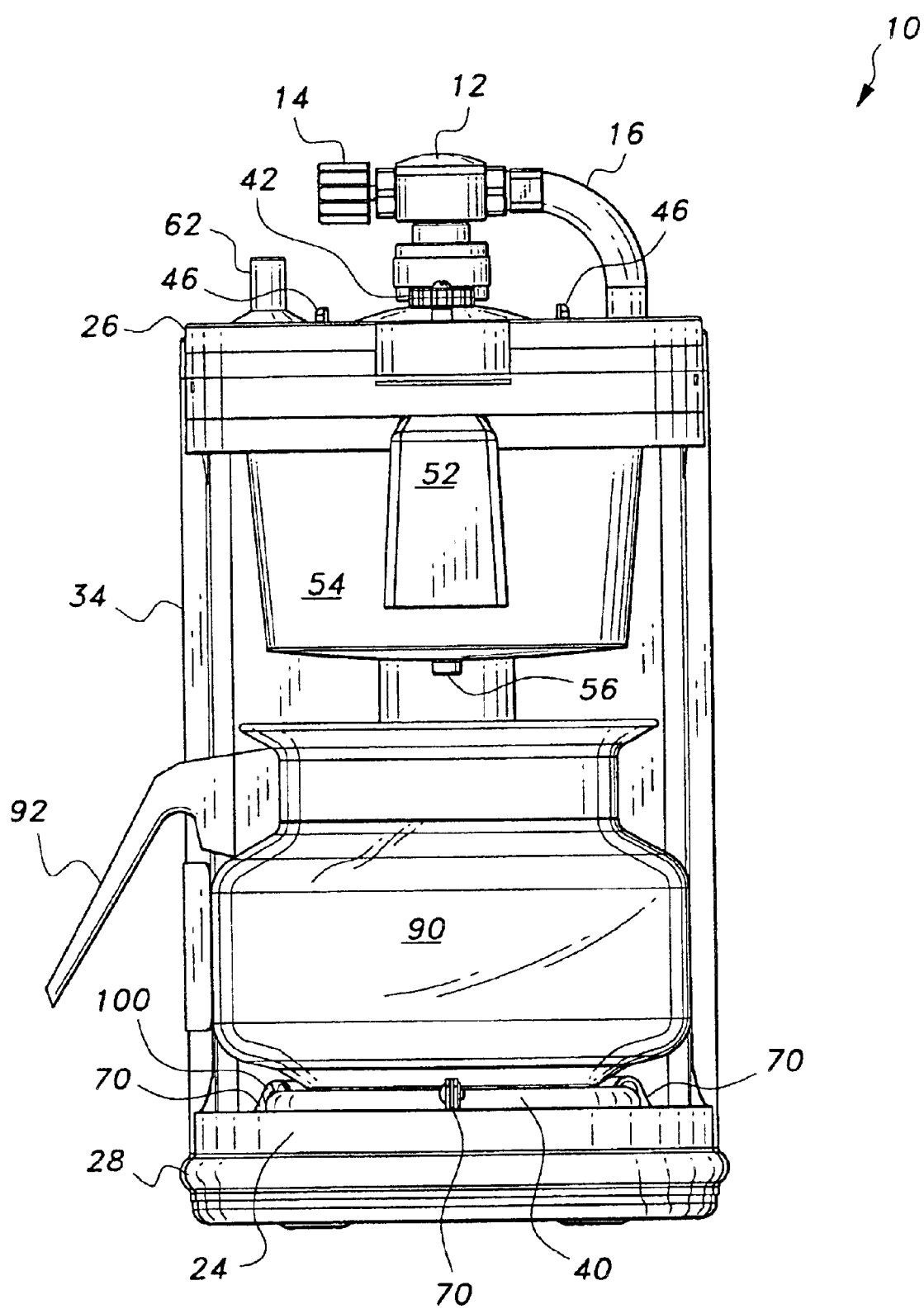
FIG. 2 is a front elevational view of the portable automatic drip coffee maker.
Figure 3:
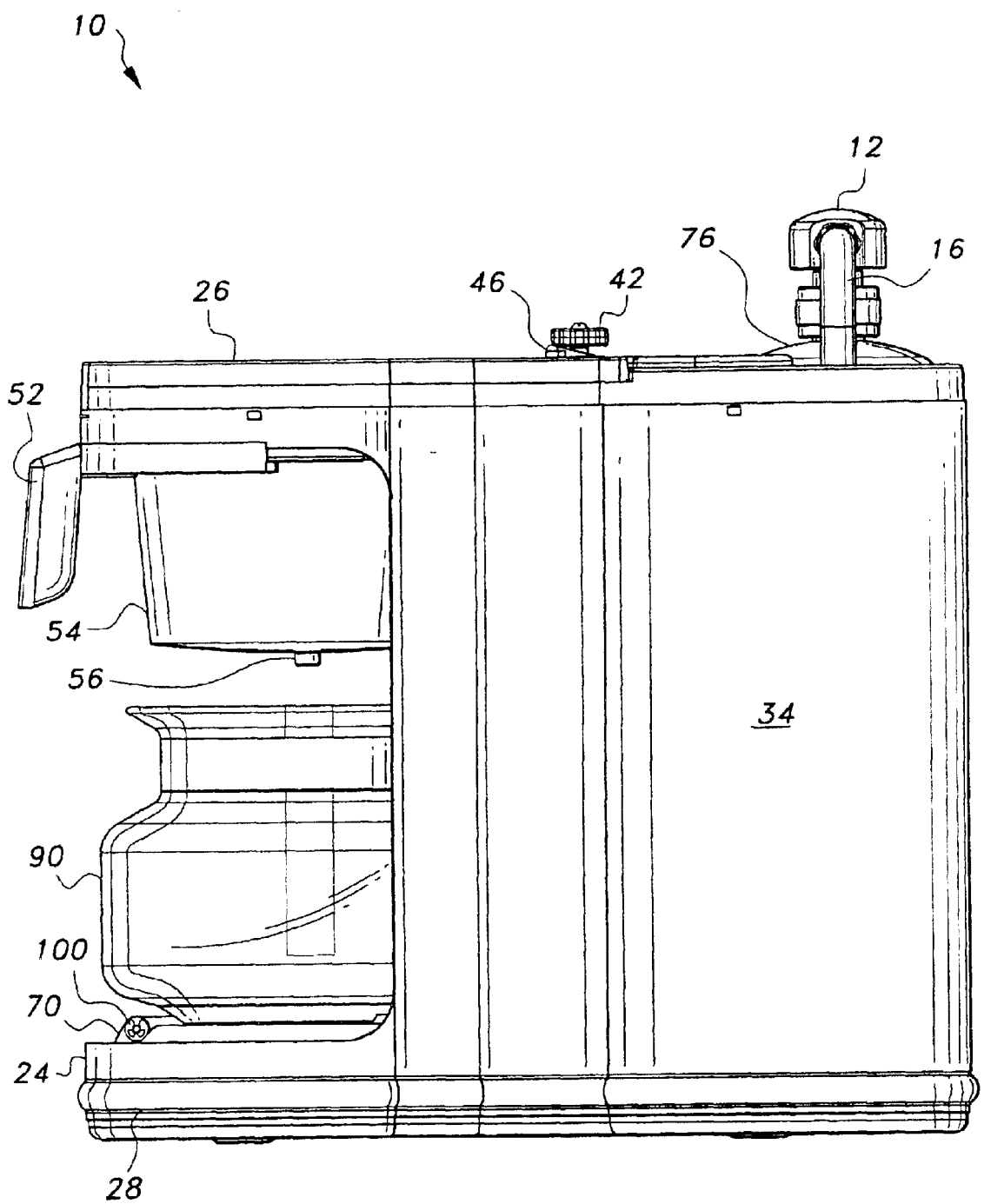
FIG. 3 is a right side elevational view of the portable automatic drip coffee maker.
Figure 4:
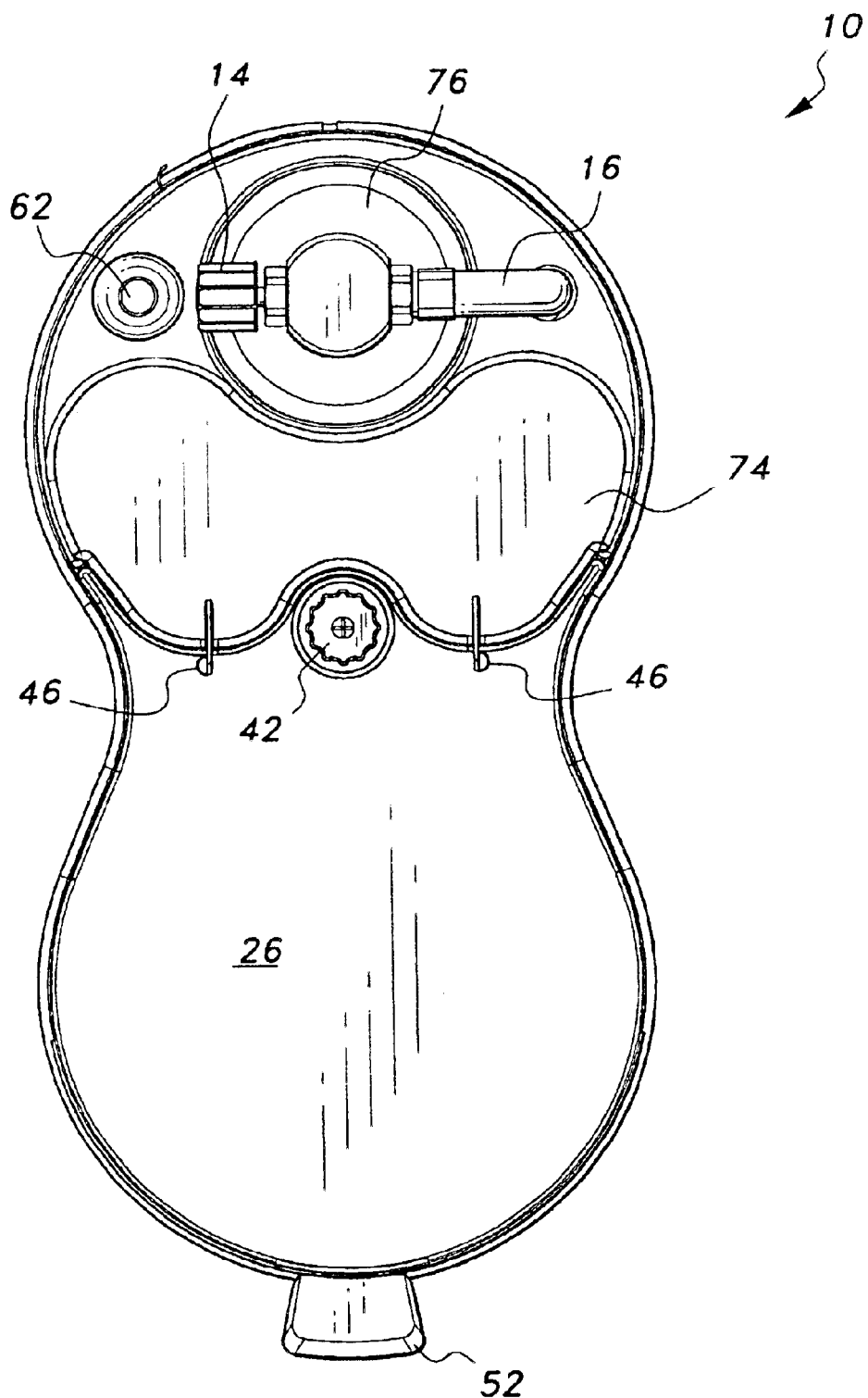
FIG. 4 is a top plan view of the portable automatic drip coffee maker.

Perspective front, side and top plan views of the inventive portable automatic drip coffee maker 10 are shown in FIGS. 1–4. The outer housing is made up of three main interlocking parts, the top 26, the sides 34 and bottom 28. Preferably these parts are made of a sturdy molded plastic material. Water reservoir 27 has a lid 74 hinged to the top of the housing that can be opened by grasping either of the grip tabs 46 and lifting the lid 74. Side door 82 can be opened to access a hot water tap (hidden) to draw hot water from a reservoir.

The coffee maker 10 has two separate fluid streams, i.e., a fuel stream used to provide heat and a water stream to provide hot water or drip coffee.

Figure 5:
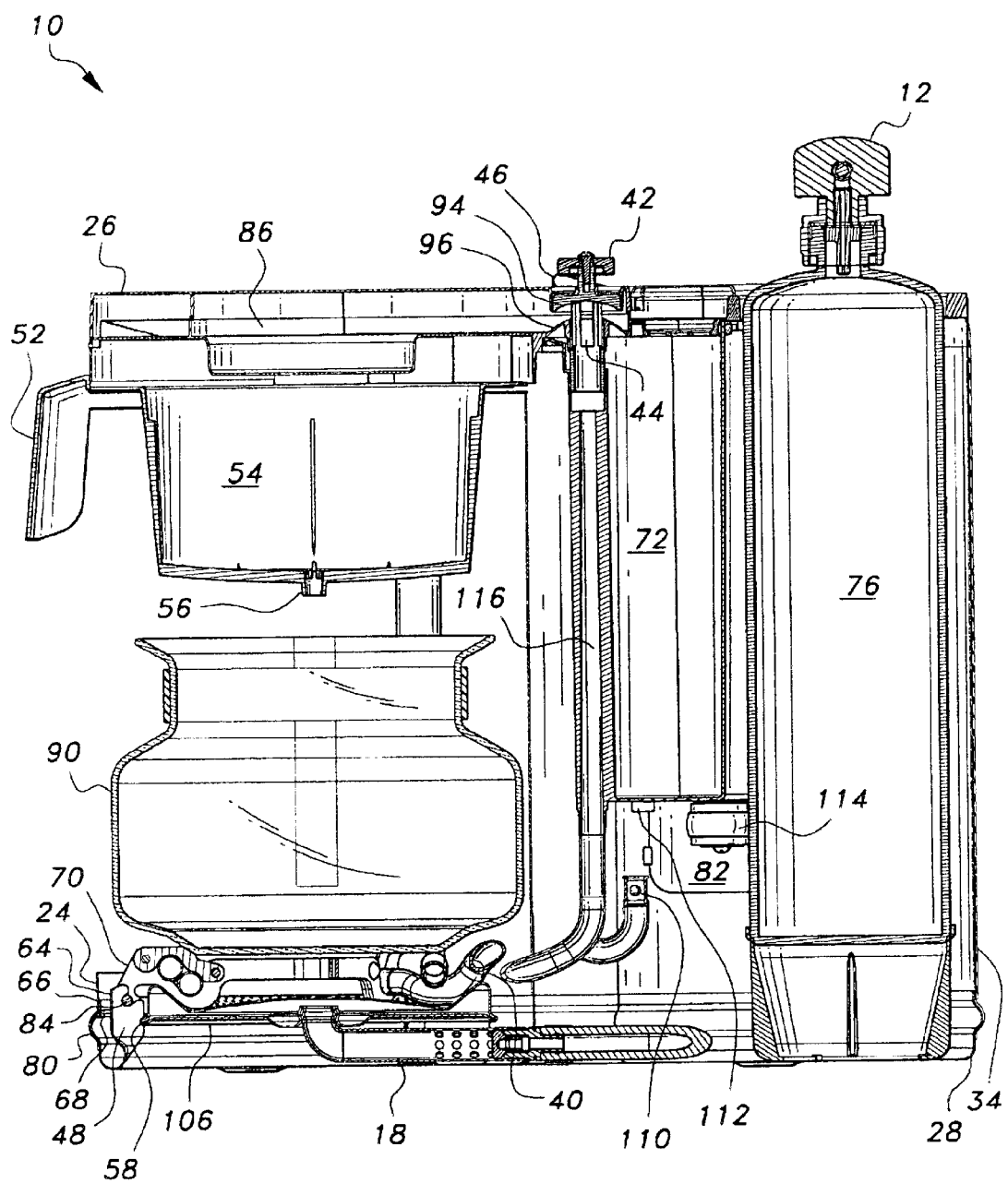
FIG. 5 is a cross-sectional view of the coffee maker as viewed from the right side.
Figure 6:
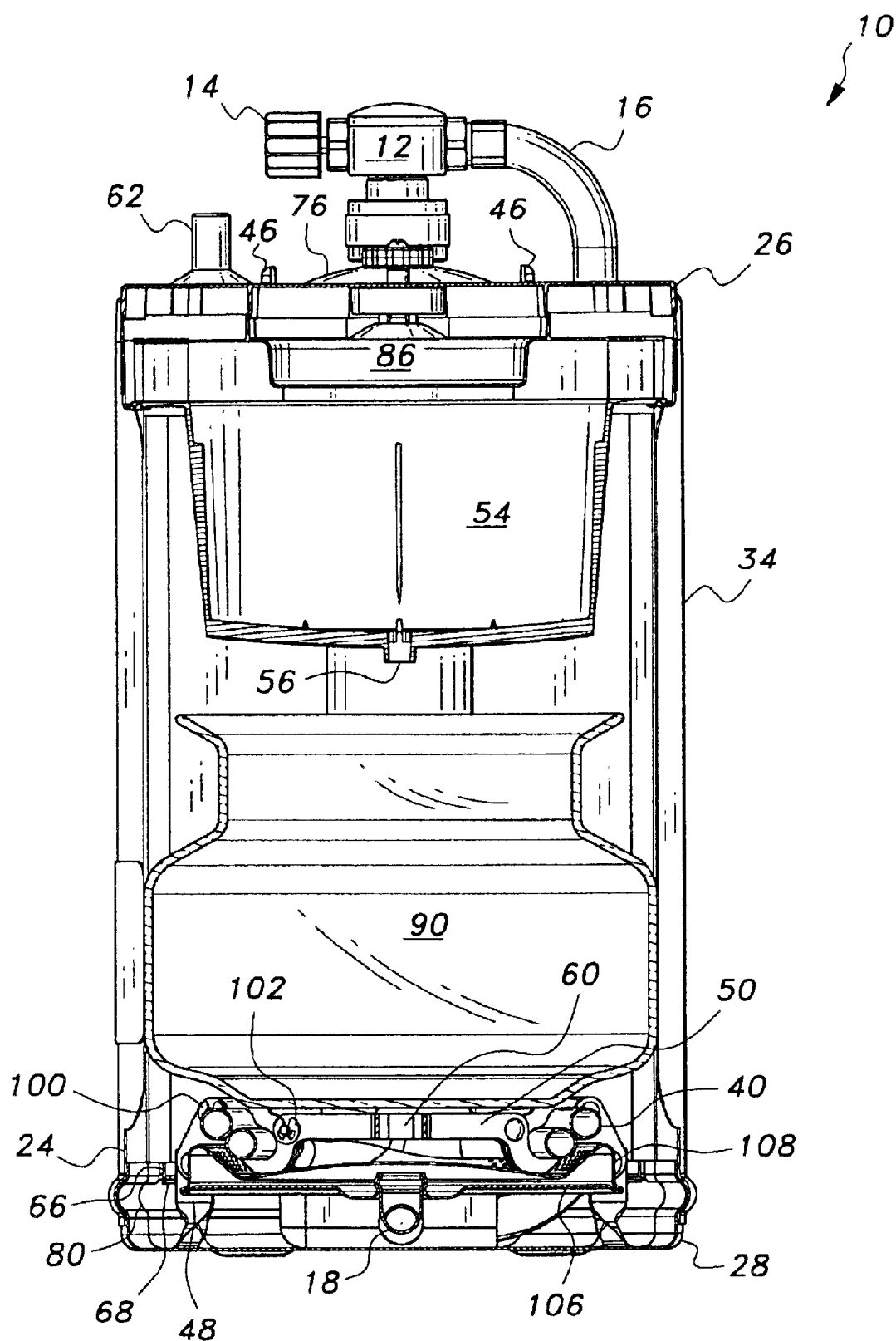
FIG. 6 is a cross-sectional view of the coffee maker as viewed from the front.
Figure 7A:
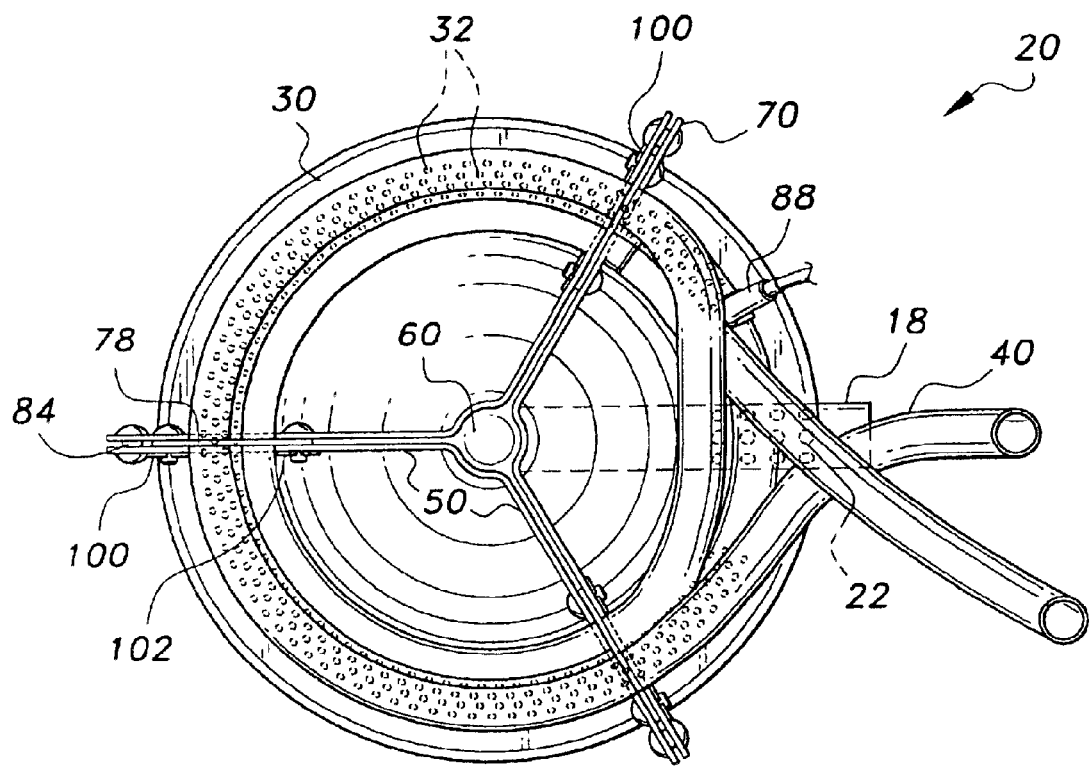
FIGS. 7A and 7B show a top plan view and a side view, respectively, of the combined water heater coil and burner assembly.
Figure 7B:
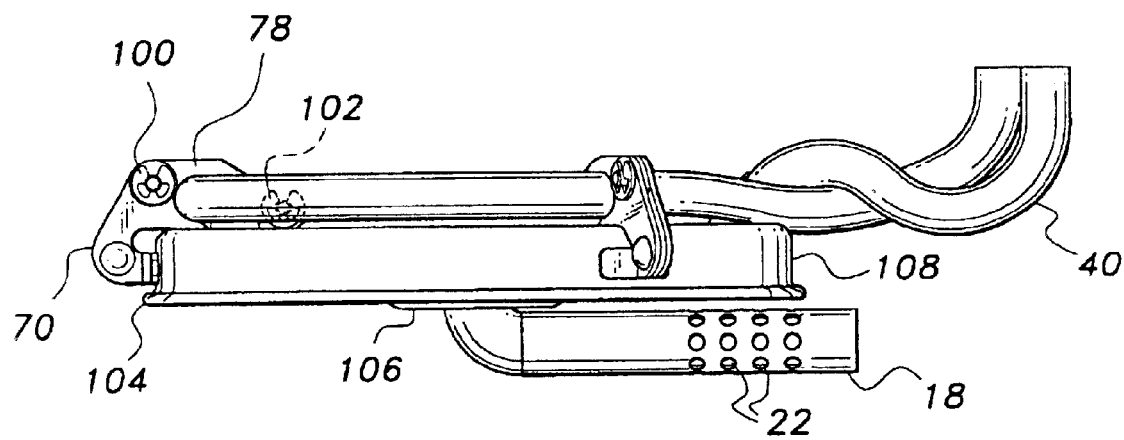

As shown in the cross-sectional views of FIGS. 5 and 6, the fuel stream begins at a fuel cylinder 76, e.g., a replaceable cylinder of either propane, butane, white gasoline, low octane gasoline, kerosene, diesel fuel, naphtha, or even peanut oil, and ends as combustion products emitted through apertures 32, seen in FIG. 7A, in the top of the burner 108 (FIG. 7B).

At the top of the fuel cylinder 76 is a fuel valve 12, e.g., a needle valve, which is adjusted using valve handle 14. Fuel passes from the cylinder 76 through valve 12 into conduit 16. Fuel conduit 16 is connected directly to the burner inlet conduit 18 where the fuel mixes with air in the aerating portion of the burner inlet.

The air enters the burner inlet conduit 18 through apertures 22 (FIGS. 5, 7A and 7B) and the fuel-air mixture enters the burner assembly 20 near its center, and is distributed radially outwardly to the burner apertures 32 (FIG. 7A). The air is drawn into the burner inlet line 18 by a partial vacuum created by the expansion of the fuel as it flows through a narrow conduit into a wider diameter conduit immediately upstream of the air inlet apertures 22. The fuel-air mixture exiting the burner apertures undergoes combustion, giving off heat that is absorbed by the water flowing in the water heating coil 40. A portion of the heat generated by the combustion is also absorbed by the carafe 90.

In order to ignite the fuel during routine use of the coffee maker 10, after partially opening fuel valve 12 to initiate fuel flow, a spark is produced by spark plug 88 (FIG. 7A) by depressing the igniter button switch 62.

The water stream can flow through two possible pathways depending upon the position of the water switching valve 44 (FIGS. 1 and 5): (1) a recirculating pathway when the water switching valve 44 is pushed downward into the closed position (not shown); and (2) a drip coffee pathway when the water switching valve 44 is pulled upward in the open position as shown in FIG. 5. Thus, the water switching valve handle 42 can be pulled up or pushed down depending upon whether the user wants to make drip coffee (i.e., the "drip coffee" mode) or to circulate hot water in the reservoir 27 (i.e., the "hot water recirculation" mode). A detailed cross-sectional view of the water switching valve 44 is shown in FIG. 5, in which the movable concave portion 94 of the valve 44 matches the contour of the stationary convex portion 96, thereby forming a seal when the valve 44 is closed.

Hot water coming from the water heater coil 40 passes through the vertical inlet conduit 116 to the water switching valve 44. In the "drip coffee" mode, the hot water passes through the slit-like opening in valve 44 into the space 86 in the top of the housing and into the basket 54 which contains a conventional filter, e.g., paper filter or metal mesh basket filter, holding coffee grounds. The filtered drip coffee then passes through the opening 56 into the carafe 90, wherein the drip coffee is collected. Carafe handle 92 permits the user to hold the carafe 90. Also, filter basket handle 52 is used to hold the filter basket 54, and to remove and replace the spent coffee grounds.

Alternatively, when the water switching valve 44 is in the "hot water recirculating" mode, the hot water passes out of the valve 44 into reservoir 72. After recirculation has taken place over a period of time, the water contained in the reservoir becomes sufficiently hot to use, e.g., for making tea. A reservoir tap 114, shown in FIG. 5, is provided to permit the user to draw hot water from the reservoir. The hot water tap is accessed by opening the housing door 82, shown in FIGS. 1 and 5.

In either mode, the water that leaves the bottom of the reservoir 27 passes through the reservoir outlet port 112 through a check valve 110, e.g., an in-line ball check valve, to ensure flow only in one direction, and into the water heater coil 40.

Features of the unique water heater coil and burner assembly 20 are shown in detail in FIGS. 7A and 7B. A 3-arm support brace 50 serves to provide support for the carafe 90 as well as to securely hold the water heater coil 40 in a fixed spaced relationship with the burner 30. The support brace 50 is made up of three pieces of stamped, bent metal strips that are riveted together. As a result, each of the three arms of the assembled, riveted support brace 50 are formed by two parallel portions of the stamped, bent metal strips, thus forming spaced dual strip arms.

The arms of the brace 50 radiate outwardly from a central opening 60 to the distal ends 70. At the end of each arm is a permanent headed rivet 84 and two removable rivet pins held by retaining rings 100 and 102. Single strip connectors 78 are held in place at their ends by the removable rivets. At the locations where the ends of the arms contact the sides of the burner 30, tabs bent 90 degrees with respect to the direction of the arms are permanently fastened to the sides of the burner 30, e.g., by soldering or welding.

Over a prolonged period of use of the coffee maker, when the internal surfaces of the water heating coil 40 become fouled and/or clogged because of accumulated deposits caused by using mineral-laden water or other water containing debris, the water heater can be removed as follows: The water reservoir 72 is drained; the water heater coil lines are disconnected from the reservoir 72; retaining rings 100 are removed from each arm of the support brace 50; and connectors 78 are lifted and rotated on the pivot provided by the inmost rivets to thereby allow the water heater coil 40 to be lifted up and away from the burner 30. A new water heater coil can then be inserted in its place, the connectors 78, and retaining rings 100 reconnected and attached, and the water heater inlet and outlet lines reconnected to the appropriate lines at the bottom of the reservoir 72.

Referring to FIGS. 5, 6 and 7A, during initial assembly of the coffee maker 10, the water heater and burner assembly 20 are installed into mounting clips 80 in the opening in the bottom portion of the housing 28 defined by the lip 24. Three mounting clips 80 are distributed in and permanently held in the opening and are arranged to correspond to the positions of the distal portions of each of the arms 50. The mounting clips 86 are made of stamped, bent metal strips. The portion of the mounting clips 80 that are permanently attached to the inside surface of the bottom opening of the housing 28 have an intermediate rounded portion.

At one end of each of the mounting clips 80 is a flat portion 48 that has two notches. The lower notch 58 accommodates the lower seamed edge 104 of the burner 30. The upper notch accommodates the shaft of the rivet pin 84 of the respective arm of the support brace. Thus, the width of the flat portion 48 of the mounting clip 80 is approximately equal to the width of the space between the two parallel strips of the arm (see item 84 in FIG. 7A). At the opposite end of each of the mounting clips 80 are two tabs 66 and 68. Once the water heater and burner assembly 20 has been installed into the mounting clips, tab 68 is bent from a vertical position 90 degrees to a horizontal position into a small notch in the back 64 of the flat portion 48 of the clip to permanently lock the mounting clips 80 onto the burner 30 and brace 50 assembly. Tab 66 remains in a vertical position attached to the inside surface of the bottom of the housing.

It is to be understood that the present invention is not limited to the embodiments described above, but encompasses any and all embodiments within the scope of the following claims.

We claim:

1. A portable automatic drip coffee maker heated by combustible fuel, comprising:
   a housing containing a fuel stream and a water stream;
   the fuel stream including:
      a burner disposed in said housing;
      a fuel conduit having a first end attached to said burner and a second end adapted for attachment to a fuel tank containing a combustible fuel;
      a flow regulating valve disposed in said fuel conduit between said burner and the fuel tank for regulating the flow of fuel to said burner; and
      ignition means for initiating combustion of fuel in said burner;
   the water stream including:
      a water reservoir;
      a water heating coil disposed above said burner;
      a drip dispenser disposed in said housing above said burner and said heating coil;
      a water conduit connecting said reservoir, said water heating coil, and said drip dispenser;
      a valve disposed in said conduit, said valve having a first position for directing water to flow from said water heating coil to said drip dispenser, and a second position directing water to flow from said water heating coil back to said water reservoir;
   a support brace holding together said burner and said water heating coil as an integral burner-heater coil assembly, the support brace including three arms extending radially outward from a central opening, and the distal end of each arm including a removable replaceable connector that can be removed to permit the separation of the water coil from the burner-heater coil assembly;
   a carafe disposed between said drip dispenser and said water heating coil; and
   a filter basket mounted on said housing disposed between said drip dispenser and said carafe.

2. The coffee maker according to claim 1, further comprising a tap connected to said water reservoir for dispensing hot water.

3. The coffee maker according to claim 1, further comprising a refillable fuel tank containing a liquid or gaseous combustible fuel.

4. The coffee maker according to claim 1, further including three mounting clips in the housing to hold the burner in place, wherein the burner has a generally disc-shaped upper surface for emitting a mixture of vaporized fuel and air upward through a plurality of outlet apertures along the perimeter thereof, a generally disc-shaped lower surface including an inlet opening at the center thereof for receiving a mixture of vaporized fuel and air from an inlet conduit, and a generally annular space between the upper surface and the lower surface for distributing the mixture of vaporized fuel and air from the inlet radially outward to the outlet apertures.

5. The coffee maker according to clam 4, wherein the upper and lower surfaces of the burner meet as a radially outwardly extending seam along a common peripheral edge of the two surfaces.

6. The coffee maker according to claim 5, wherein each mounting clip includes a pair of notches, and the distal end of each arm of the brace includes an attachment pin having a horizontal shaft such that one of the two notches of each mounting clip receives and securely holds a portion of the seam of the peripheral edge of the burner, and the second notch receives and holds the shaft of a respective attachment pin, thereby securely fastening the burner and brace to the housing.

7. The coffee maker according to claim 6, wherein each mounting clip includes a bendable tab that is movable from an initially vertically upward position to a final horizontal position, such that before the burner-water heater coil assembly is fastened to the mounting clips, the bendable tab is in the vertically upward position and, after the burner-water heater coil assembly is fastened to the mounting clips, the tab is bent to the horizontal position, thereby locking the burner and brace in place in the mounting clips.

8. The coffee maker according to claim 1, wherein the combustible fuel is gaseous.

9. The coffee maker according to claim 1, wherein the combustible fuel is liquid.

10. The coffee maker according to claim 1, wherein the combustible fuel contained in a replaceable or refillable cylinder is selected from the group consisting of propane, butane, white gasoline, kerosene, diesel fuel, naphtha, and peanut oil.

11. The coffee maker according to claim 10, wherein the combustible fuel is propane.

12. The coffee maker according to claim 10, wherein the combustible fuel is butane.

13. The coffee maker according to claim 10, wherein the combustible fuel is white gasoline.

14. The coffee maker according to claim 10, wherein the combustible fuel is kerosene.

15. The coffee maker according to claim 10, wherein the combustible fuel is diesel fuel.

16. The coffee maker according to claim 10, wherein the combustible fuel is naphtha.

17. A method of replacing a water heater coil in the coffee maker of claim 1, comprising the steps of:

disconnecting the water heater coil from the water stream;

removing each of the three removable connectors to release the water heater coil from the burner-water heating coil assembly;

removing the water heater coil from the assembly;

inserting a replacement water heater coil in the assembly;

reconnecting the three connectors, thereby securing the replacement water heater coil in the integral burner-water heater coil assembly; and connecting the inlet and outlet conduits of the replacement water heater coil to the water stream.

18. A portable automatic drip coffee maker heated by combustible fuel, comprising:

a housing containing a fuel stream and a water stream;

the fuel stream including:

a burner disposed in said housing;

a fuel conduit having a first end attached to said burner and a second end adapted for attachment to a fuel tank containing a combustible fuel; and a flow regulating valve disposed in said fuel conduit between said burner and the fuel tank for regulating the flow of fuel to said burner;

the water stream including:

a water reservoir;

a water heating coil disposed above said burner;

a drip dispenser disposed in said housing above said burner and said heating coil;

a water conduit connecting said reservoir, said water heating coil, and said drip dispenser;

a support brace holding together said burner and said water heating coil as an integral burner-heater coil assembly, the support brace including three arms extending radially outward from a central opening, and the distal end of each arm including a removable replaceable connector that can be removed to permit the separation of the water coil from the burner-heater coil assembly;

a carafe disposed between said drip dispenser and said water heating coil; and a filter basket mounted on said housing disposed between said drip dispenser and said carafe.

* * * * *